United States Patent Office 2,754,315
Patented July 10, 1956

2,754,315
METHOD OF MAKING TRIALLYL PHOSPHATE

Arthur Dock Fon Toy, Park Forest, and James R. Costello, Chicago Heights, Ill., assignors to Victor Chemical Works, a corporation of Illinois No Drawing. Application August 25, 1952,
Serial No. 306,304

5 Claims. (Cl. 260—461)

This invention relates to the preparation of triallyl phosphate.

It has been previously proposed to produce triallyl phosphate by a slowly adding phosphorus oxychloride to a mixture of allyl alcohol and a base. This resulted in an impure product that was not polymerizable to a hard glass-like polymer without requiring distillation and the product was produced in relatively poor yields. In contrast to this and similar prior methods, the methods of this invention which involve controlling the reacting proportions of the reactants produces a purer product in greater yields and produces a product which may be polymerized to a hard glass-like polymer without requiring distillation. This purification by distillation which was formerly necessary but which is now not necessary is quite hazardous as is pointed out in a safety report published in Chemical and Engineering News, volume 28, page 3452 (1950). Thus the avoidance of this purification by distillation is a very important advantage of the invention described and claimed herein.

A purer triallyl phosphate of undistilled quality is produced in high yield by controlling the reaction of allyl alcohol and phosphorus oxychloride in the presence of an organic amine base in such manner that the amine base is added immediately subsequent to the addition of the phosphorus oxychloride. This is accomplished by simultaneously adding the phosphorus oxychloride and amine base at such rates that the oxychloride is always present in stoichiometric excess over the amine base until the final addition of the amine base is made. This final excess of base is important in combining with the last portion of the liberated hydrogen chloride.

The reaction may be illustrated by the following equation using trimethylamine as the organic base.

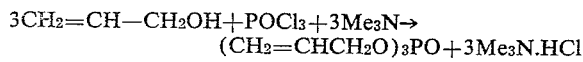

This is essentially the same equation as is employed in the prior art. However, the procedural conditions are quite different. In the prior art all of the amine was added at the start and followed with gradual addition of the phosphorus oxychloride. The crude prior art product required purification (by distillation) before it could be polymerized to a hard glass-like polymer. Under the improved process described and claimed here of simultaneously adding the amine base and oxychloride a relatively pure triallyl phosphate is obtained which can be polymerized to a hard glass-like polymer without having to employ the hazardous distillation purification step of the prior art.

Triallyl phosphate of polymerizable quality is a highly desirable intermediate for use in the process of flameproofing fabrics wherein the triallyl phosphate is polymerized, brominated and applied to the fabric. Prior to the process of the present invention it has been necessary to distill the triallyl phosphate to render it useful in such flameproofing process.

It is believed that the reaction proceeds in a step-wise manner, first, with the formation of the monoallyl dichlorophosphate, then the diallyl chlorophosphate and finally the triallylphosphate, and that when an excess of the amine base is in contact with the intermediate chlorophosphates the excess results in the formation of small amounts of some complex side reaction product such as, perhaps, a diallyl chlorophosphate-amine complex which readily decomposes into allyl chloride and acidic reaction products. These appear to act as polymerization inhibitors in the formation of the final triallyl phosphate product. The present invention successfully prevents or at least minimizes this action.

Whether or not this theory is correct it has been found that by controlling the addition of the amine base and phosphorus oxychloride to the allyl alcohol, in such manner that during the period of adding the oxychloride the mol ratio of the amine base to the oxychloride is maintained at not over 3 to 1, an undistilled polymerizable triallyl phosphate product is obtained. Further, it has been found that by controlling the reaction in this manner the process may be carried out at temperatures up to 0° C. with satisfactory yields of a polymerizable crude triallyl phosphate product. While reaction temperatures as low as —30° C. are not essential in the present process, they may be employed with some advantage in yields.

In carrying out the new process it is preferred that the allyl alcohol be present in excess of the stoichiometric amount required to react with the phosphorus oxychloride and that the final amount of amine base should at least be the stoichiometric equivalent of the hydrogen chloride liberated in the reaction. Generally, it is preferred to employ about 20% excess allyl alcohol, and about 4% excess of the amine base, though smaller excess amounts are suitable.

The base is preferably an amine base which may be any suitable tertiary amine such as triethylamine, pyridine, trimethylamine, and the like. The base is one that is capable of taking up the liberated hydrogen chloride.

The reaction may be carried out without use of a solvent, but it is preferred to employ an inert solvent medium such as toluene, benzene, and the like, to facilitate the mixing operation.

The following examples are given to illustrate the character of the new process.

Example 1

A solution of 230 grams (3.98 mols) (20% excess) allyl alcohol and 494 grams toluene was placed in a 2 liter flask, equipped with stirrer, thermometer, inlet and outlet connections, and a suitable cooling bath for controlling the reaction temperature. To the solution in the reaction flask 170 grams (1.11 mols) of phosphorus oxychloride (POCl₃) and 350 grams (3.45 mols) (4.7% excess) triethylamine (Et₃N) were simultaneously added dropwise at such rate that the POCl₃ was uniformly added in 4 hours and 50 minutes and the Et₃N in 5 hours and 5 minutes. This represents a mol ratio of 2.97 mols Et₃N to 1 mol POCl₃ during the period while the POCl₃ was being added. The reaction temperature was maintained at about —30° to —40° C. while the reactants were being added and for 15 minutes thereafter. The reaction vessel was then placed in an ice-salt bath and stirred overnight while the temperature of the mixture gradually increased to room temperature. The triethylamine hydrochloride formed was filtered off and washed with a liter of toluene. The filtrates were combined and washed with 100 ml. of a 10% brine, and 100 ml. of a 10% NaHCO₃ solution to remove the excess alcohol and amine and any residual acidity. The toluene solvent was removed at 30° C. and 20 mm. pressure and the product subjected to further vacuum (2 mm. pressure) for five hours until a constant weight was obtained. The crude triallyl phosphate weighed 236.2 grams (97.8% yield) and had an index of refraction of $N_D^{25}=1.4510$. In testing the product a 5 gram sample was polymerized with 0.15 gram (3%) benzoyl peroxide at 85–90° C. in 17 hours to give a dark amber colored, hard solid.

*Example II*

The above example was repeated except that the POCl₃ was added in 3.5 hours and the Et₃N added in 5.5 hours. This represents the addition of 1.99 mols Et₃N per mol POCl₃ during period of POCl₃ addition. The resulting triallyl phosphate product had an index of refraction $N_D^{25}=1.4509$ and was obtained in a 94.8% yield. The polymerizing character of the product was tested as in the above example and found to give a satisfactory yellow glassy solid polymer.

*Example III*

For comparative purposes the same quantities of allyl alcohol, phosphorus oxychloride, and triethylamine were reacted in toluene at −30° to −40° C. under the prior art procedure of adding all of the amine base at once and then slowly adding the phosphorus oxychloride over a period of 4.5 hours. The crude triallyl phosphate product obtained in a 79.5% yield had an index of refraction of $N_D^{25}=1.4530$. The product, however, could not be polymerized in the presence of 3% benzoyl peroxide by heating at a temperature of 85° C. for 17 hours.

In the above examples it is clearly demonstrated that our improved procedure, of carrying out the reaction of phosphorus oxychloride and allyl alcohol in the presence of an amine base wherein the amount of the amine base is maintained at less than the stoichiometric amount of the phosphorus oxychloride until all of the oxychloride has reacted, results in greatly improved yields of a higher quality triallylphosphate ester than is obtainable under the prior art process.

*Example IV*

In a further exemplification of our improved procedure 1.11 mols of phosphorus oxychloride was slowly added, uniformly, over a period of 4.2 hours to 3.96 mols of allyl alcohol in 490 grams toluene while simultaneously adding trimethylamine (Me₃N) at a rate equivalent to 2.50 mols Me₃N per mol of POCl₃ until all of the POCl₃ has been added and continuing the Me₃N addition until 4.16% excess has been added, while maintaining a temperature of −30° to −40° C. throughout the reaction period by cooling the vessel. After stirring overnight in an ice-salt bath, the amine hydrochloride formed in the reaction is filtered off, and the filtrate washed with successive 100 ml. portions of a 10% sodium chloride solution and a 10% sodium bicarbonate solution. The toluene and water are removed by vacuum at 30° C. until the liquid monomeric triallyl phosphate is brought to constant weight. A 93.3% yield of product having an index of refraction $N_D^{25}=1.4538$ was obtained. The polymerizing character of the product was tested by heating a 5 gram sample with 3% benzoyl peroxide for 17 hours at 85° C. A light yellow glassy polymer was obtained. Similar results were also obtained with only 2% benzoyl peroxide.

*Example V*

For comparative purposes Example IV was repeated except that the trimethylamine was added first and followed by the slow addition of the POCl₃ over a period of 3.10 hours as indicated by the prior art. The resulting triallylphosphate product having an index of refraction of $N_D^{25}=1.4551$ was obtained in a yield of only 72.5%. The yield was much lower than that of Example IV.

*Example VI*

Following the procedure of Example IV with pyridine substituted for the trimethylamine and rate of addition of the amine being 2.83 mols per mol of POCl₃ while the POCl₃ was being added (in 6.33 hours) a 99.5% yield of high quality triallylphosphate was obtained. The product had an index of refraction of $N_D^{25}=1.4502$ and satisfactorily met the polymerization test with 3% benzoyl peroxide.

The above examples illustrate the yield and quality advantages of our improved method over the prior art procedure. In the use of pyridine, triethylamine and trimethylamine at temperatures of about −30° to −40° C. under our new procedure greatly improved yields are obtained. In the use of trimethyl and triethyl amines the polymerization qualities of the undistilled triallyl phosphate product are greatly improved.

While it is preferred to employ the lower reaction temperatures we have found that satisfactory results are obtainable under our improved procedure, at temperatures up to about 0° C. The following examples are illustrative of the higher temperature reaction.

*Example VII*

Following the procedure outlined in Example I except that the reaction temperature was maintained at a temperature of −5° to −10° C. and the POCl₃ added in 6.16 hours while the Et₃N was added in 8 hours we obtained an 88.5% yield of triallyl phosphate having an index of refraction of $N_D^{25}=1.4522$. The polymerization test gave a satisfactory amber colored glassy polymer with 3% benzoyl peroxide.

*Example VIII*

In a comparative experiment where the triethylamine was added first and the POCl₃ then added over a period of five hours under reaction temperature range of −5° to −10° C. the triallyl phosphate product was obtained in 80% yield. The product, however, was not polymerizable, and therefore was not suitable for fireproofing fabrics.

*Example IX*

Following our improved procedure, maintaining a reaction temperature of −5° to −10° C., pyridine was added simultaneously with POCl₃ to allyl alcohol at a reaction rate of 2.58 mols pyridine per mol of POCl₃ during a 3.5 hour period while the POCl₃ was being added. Four and one-quarter hours were required to add the total amount of pyridine (4.16% excess). An 83% yield of triallyl phosphate was obtained. The product could be polymerized to a hard artgum-like solid.

The foregoing detailed description is given for clearness of understanding only, and no unnecessary limitations should be understood therefrom, for some modifications will be obvious to those skilled in the art.

We claim:

1. In the preparation of triallyl phosphate by reacting allyl alcohol with phosphorus oxychloride in the presence of a tertiary amine, and method which comprises slowly and simultaneously adding the amine and oxychloride to an excess of allyl alcohol in a ratio such that the oxychloride is present in stoichiometric excess over the amine so that the mol ratio does not substantially exceed three mols of amine per mol of oxychloride during the addition until all of the oxychloride has been added while maintaining a reaction temperature between about 0° C. and −40° C.

2. The method of claim 1 wherein the amine is a member of the class consisting of trimethylamine, triethyl amine and pyridine.

3. The method of claim 1 wherein the temperature of the reaction is maintained between about −30° and −40° C.

4. In the preparation of triallyl phosphate by reacting allyl alcohol with phosphorus oxychloride in the presence of a tertiary amine, the method which comprises slowly and simultaneously adding the amine and oxychloride to an excess of allyl alcohol in a ratio such that the oxychloride is present in stoichiometric excess over the amine so that the mol ratio does not substantially exceed three mols of amine per mol of oxychloride during the addition until all of the oxychloride has been added while maintaining a reaction temperature between about 0° C. and —40° C., then adding an excess of amine as soon as all the oxychloride has been added, filtering the reaction mixture, washing the filtrate consecutively with solutions of sodium chloride and sodium bicarbonate to remove the excess allyl alcohol, excess amine and residual acidity, and then drying the triallyl phosphate product.

5. The method of claim 4 wherein the mol ratio is within the range of two to three mols of amine per mol of oxychloride during the addition of the oxychloride, and the reaction temperature is between about —30° C. and —40° C.

References Cited in the file of this patent

UNITED STATES PATENTS 2,394,829     Whitehill et al. _____ Feb. 12, 1946

OTHER REFERENCES

J. A. C. S. Chemistry of the Aliphatic Esters of Thiophosphoric Acids, Martin, vol. 67, pg. 1662 (1945).